United States Patent [19]

Ohkubo et al.

[11] 4,122,322

[45] Oct. 24, 1978

[54] TEMPERATURE DETECTING UNIT EMPLOYED IN A MICROWAVE OVEN

[75] Inventors: Masaru Ohkubo, Yamatokoriyama; Akihiko Ueno, Osaka, both of Japan

[73] Assignee: Matsushita Electric Industrial Co., Ltd., Kadoma, Japan

[21] Appl. No.: 816,196

[22] Filed: Jul. 15, 1977

[30] Foreign Application Priority Data

Jul. 20, 1976 [JP] Japan .............................. 51-97159[U]
Jul. 20, 1976 [JP] Japan .............................. 51-97160[U]

[51] Int. Cl.² .............................................. H05B 9/06
[52] U.S. Cl. .............................. 219/10.55 R; 73/352; 219/10.55 E
[58] Field of Search ................. 219/10.55 E, 10.55 R; 174/74 R, 75 R; 339/276 T; 73/352

[56] References Cited

U.S. PATENT DOCUMENTS

| | | |
|---|---|---|
| 3,974,696 | 8/1976 | Fitzmayer .................. 219/10.55 E X |
| 3,975,720 | 8/1976 | Chen et al. ............... 219/10.55 E X |
| 3,988,929 | 11/1976 | White et al. .............. 219/10.55 R X |
| 3,988,930 | 11/1976 | Fitzmayer et al. ....... 219/10.55 R X |
| 3,991,615 | 11/1976 | Hornung .................... 219/10.55 R X |
| 4,038,510 | 7/1977 | White ........................... 219/10.55 E |

Primary Examiner—Arthur T. Grimley

[57] ABSTRACT

A temperature detecting unit extended, through a cable, from an inside wall of the microwave oven has a probe formed at end portion thereof for inserting the probe into an object such as food items to be heated for detecting the temperature of the object during the heating, so as to produce a signal indicative of the temperature of the object. The cable of the temperature detecting unit is formed by comparatively thin wires having sufficient flexibility and durability so as to facilitate the manipulation of the unit during inserting thereof into the object.

11 Claims, 8 Drawing Figures

TEMPERATURE DETECTING UNIT EMPLOYED IN A MICROWAVE OVEN

BACKGROUND OF THE INVENTION

The present invention relates to a microwave oven, and more particularly, to a temperature detecting unit to be incorporated in the microwave oven for detecting the temperature of the object to be heated.

It is known to use a temperature detecting unit in a microwave oven for electrically detecting the temperature of the object to be heated in the oven. The temperature detecting unit of the convention type includes a probe portion including a handle for holding and capable of being inserted, at one end thereof, into the object and a cable extended from the other end of the probe to an inside wall forming a heating cavity in the microwave oven. According to the conventional type of the temperature detecting unit, the cable is normally constructed with a comparatively thick and stiff wires so as to increase shock resistance of the temperature detecting unit and to strengthen the connection of the cable at the opposite ends thereof with respective connected elements. Moreover, such stiff cable hinders efficient handling of the temperature detecting unit particularly when the probe must be used at positions where it is necessary to stretch out the cable, and even when the probe is inserted to the object somehow with the cable stretched, the temperature detecting unit is comparatively unstable in its position, and thus, the unit may easily fall off from the applied position, whereby the probe, especially a temperature detecting element provided therein, may be damaged, or otherwise, there may be produced an undesirable spark discharge between the probe and the inside wall of the heating cavity. Such spark discharge may cause some flaw on the inside wall or on the probe, not only spoiling the appearance of the oven, but also giving rise to insanitary condition if fragments of food material and the like should get in the flaw. On the other hand, if the cable is constituted with thin wires, there is such a disadvantage that the cable is apt to be damaged or broken particularly at opposite ends thereof connected to the probe and the inside walls of the heating chamber. Furthermore, in the arrangement as described above, convenience in actual use is commonly sought after, for example, by automatic change over from cooking by the temperature detecting unit to that by timer means through selective insertion and withdrawal of the probe of the detecting unit into and from the objects to be heated, and therefore, should the cooking be carried out by the timer means with the temperature detecting unit carelessly left in the heating chamber due to handling difficulty of the detecting unit as described above, the detecting unit is readily subjected to burning. Accordingly, development of a temperature detecting unit easy to handle, and yet having sufficient durability has been strongly damanded up to the present.

OBJECT OF THE PRESENT INVENTION

It is a primary object of the present invention to provide an improved type of temperature detecting unit which is provided with a comparatively flexible cable for facilitating the manipulation of the unit.

It is another object of the present invention to provide a temperature detecting unit of the above described type which has sufficient strength at joints where the opposite ends of the cable is connected with respective connected members.

It is yet another object of the present invention to provide a temperature detecting unit of the above described type which is so arranged as to eliminate spark discharge between the probe and the inside wall of the heating cavity.

It is a further object of the present invention to provide a temperature detecting unit of the above described type in which flexibility of the cable is maintained while resistance against bending of the cable at opposite ends thereof is improved.

It is a still further object of the present invention to provided a temperature detecting unit of the above described type in which the bending effect between the cable and the respective connected members provided at opposite ends of the cable is maintained during its use for improving durability of the detecting unit.

SUMMARY OF THE INVENTION

In order to accomplish these and other objects, the temperature detecting unit of the present invention comprises a probe member including a handle for holding and capable being inserted, at one end thereof, into the object to be heated, a cable extended from the other end of the probe and a plug member connected to the cable for detachably connecting the cable to a control system provided in the microwave oven. The plug member comprises a metallic casing having one end formed with a reduced diameter portion and a projection member, including two terminals, extending from the other end of the casing for effecting connection between the plug member and the control system. The cable employed in the temperature detecting unit of the present invention is a coaxial cable including an inner conductive lead line, an inner insulating tube, an outer conductive lead line netted outside the inner insulating tube and an outer insulating tube. The inner and outer conductive lines are constructed by comparatively thin wires so that the cable itself is flexible. The connection between the cable and the plug member is accomplished by inserting the cable into a cylindrical metallic casing of the plug, in which the inner conductive lead line is connected to one terminal formed in the projection member, and the outer conductive lead line is connected, through said metallic casing, to the other terminal formed in the projection member. The connection between the inner lead line and said one terminal is effected preferably through soldering, and some length of the inner lead line, covered with the inner insulating tube, is loosely placed inside the metallic casing. A ring member, preferably made of synthetic resin, is loosely mounted on the inner insulating tube so as to cause said inner insulating tube to slide through said ring member. The ring member is placed between the inner insulating tube and the outer lead line which is located at the reduced diameter portion of said casing whereat a bare outer lead line is extended. The connection between the outer lead line and the casing is effected at a portion where the diameter of the reduced diameter portion is further reduced, namely at a bottle neck portion. At the bottle neck portion, the outer lead line is tightly held between the casing and the ring member.

According to such construction employed for connecting the cable with the plug member, an undesirable pulling force applied onto the cable in a direction away from the plug in such a manner to disconnect the cable from the plug member is eliminated to be evenly distributed to the outer lead line where it is connected with the casing and also to the outer insulating tube at which it is connected to the casing. Furthermore, such disconnecting force may not affect the connection between the inner lead line and the plug member, since the inner insulating tube slides through the ring member during the outer lead line and the outer insulating tube is being pulled. Thus, the connection as described above reduces the possibility of breaking the connection between the cable and the plug member.

The plug member further comprises a bushing, preferably formed by a silicon rubber, formed outside the reduced diameter portion of the casing for tightly holding the outer insulating tube which is placed between the bushing and the reduced diameter portion of the casing. In order to ensure the connection between the outer insulating tube and the bushing, the contacting faces therebetween is bonded, preferably by a bond consisting of silicon compound. This type of bond is, however, comparatively weak in adhesive strength, especially when the bonded surface is bent or receives external force in a tearing off direction. Since, according to the present invention, the surfaces where it is bonded is supported by the reduced diameter portion of the casing, there will be hardly any bending force to be exerted onto the surfaces bonded, and thus the adhesive strength of the bond is maintained.

The temperature detecting unit of the present invention makes use of a similar construction of connection as described above for the connection between the cable and the probe member. Provided onto the probe is a handle which has a cylindrical configuration and the outer diameter thereof is increased at one end thereof, wherefrom the probe projects outwardly, so as to maintain the probe, when the temperature detecting unit is placed onto the bottom surface of the cavity, in a spaced relation from the bottom surface at a predetermined distance.

These and other objects and features of the present invention will become apparent from the following descriptions taken in conjunction with preferred embodiments thereof with reference to the accompanying drawings, in which

FIG. 3a is a fragmentary sectional view of the temperature detecting unit shown in FIG. 2;

FIG. 3b is an enlarged detail view showing connection between a cable and a plug member employed in the temperature detecting unit of FIG. 3a.

Figure 1:
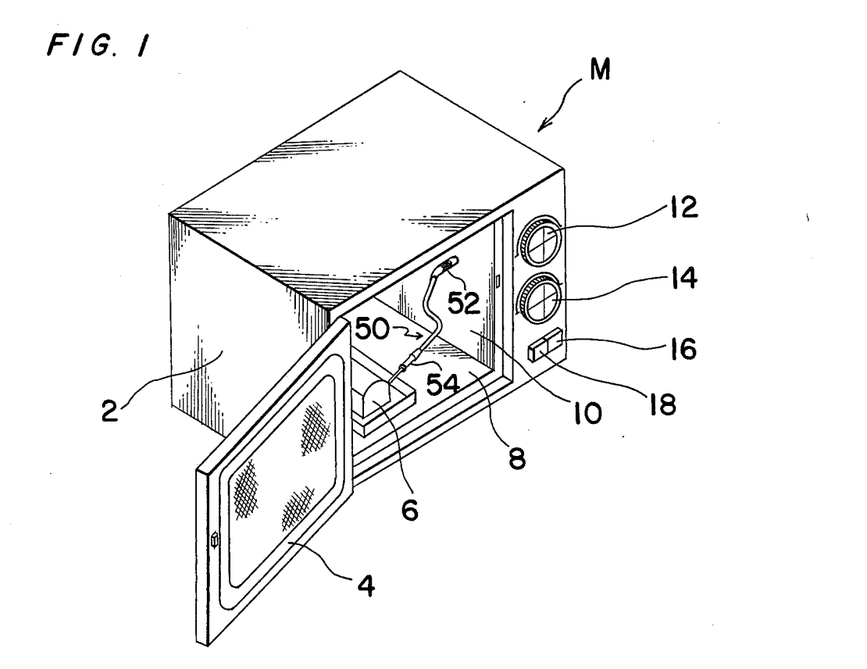
FIG. 1 is a perspective view of a microwave oven to which a temperature detecting unit of the present invention may be applied.
Figure 2:
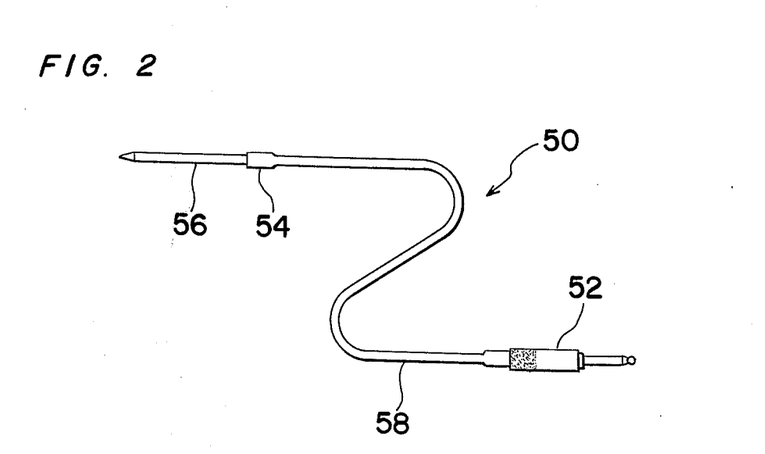
FIG. 2 is a top plan view of the temperature detecting unit of the present invention.

Referring first to FIG. 1, there is shown a microwave oven M to which the present invention is applicable. The microwave oven M of a double wall structure comprises an outer casing 2 of cubical box-like shape, and a door member 4 hingedly connected to the side edge of the casing 2 for selectively opening the casing 2 to insert an object 6 such as food items into a heating cavity 8 formed inside the casing 2 and constituted by inner walls 10, and for closing the casing 2 to close the heating cavity 8 by the door member 4. The object 6 described as food items may be of any other items and may be presented in any forms such as in liquid form or in solid form. The object 6 in the instance shown in FIG. 1 is in a form of solid. Extending from the inner wall 10, especially from the inner wall shown in the right-hand side, is a temperature detecting unit 50 of the present invention. The temperature detecting unit 50, as shown in FIG. 2 includes a plug portion 52 which is inserted into a pin-jack (not shown) formed in the inner wall 10 for an electrical connection with a control system which will be described later in connection with FIGS. 6 and 7, and for supporting the temperature detecting unit 50, a detecting portion 54 having a probe 56 capable of being inserted into the food item for detecting the temperature of the food item 6, and coaxial or concentric cable 58 extended between the plug portion 52 and the detecting portion 54. The detail construction of the temperature detecting unit 50 is described later in connection with FIGS. 3 and 5, however, in the meantime further structure and function of the microwave oven M is described hereinbelow in connection with FIG. 1.

On the front side and at the right-hand side of the microwave oven M, when viewed in FIG. 1, there are provided various controlling switches and dials, such as a temperature setting dial 12, a cooking time setting dial 14, a cooking lamp switch 16 and a cook switch 18. The microwave oven of this type as described above controls the cooking time in two different systems. In the first system, namely time preference system, the food item placed inside the oven M is heated up during a predetermined time which is being set by the cooking time setting dial 14. Here the cooking time setting dial 14 is coupled with a timer switch, which will be described later, and is capable of setting time, for example, between 0 minute and 20 minutes. During the operation of this time preference system, the temperature detecting unit 50 disconnected from the pin-jack and is taken out form the cavity of the oven M, so that the temperature setting dial 12 is substantially disconnected from the control system.

In the second system, namely temperature preference system, the food item placed inside the oven M is heated up until the food item reaches a predetermined temperature defined by the temperature setting dial 12. Here, the temperature setting dial 12 is coupled with the temperature detecting unit 50 by the connection between the plug portion 52 and the pin-jack and is capable of setting the cooking temperature, for example, between 20° C. and 120° C. During the operation of this temperature preference system, the temperature detecting unit 50 is connected to the control system upon insertion of the plug portion 52 into the pin-jack while the probe 56 thereof is pierced into the food item. The insertion of the plug portion 52 into the pin-jack substantially disconnects the time preference system, i.e., the time setting dial 14 from the control system.

Figures 3A, 3B:
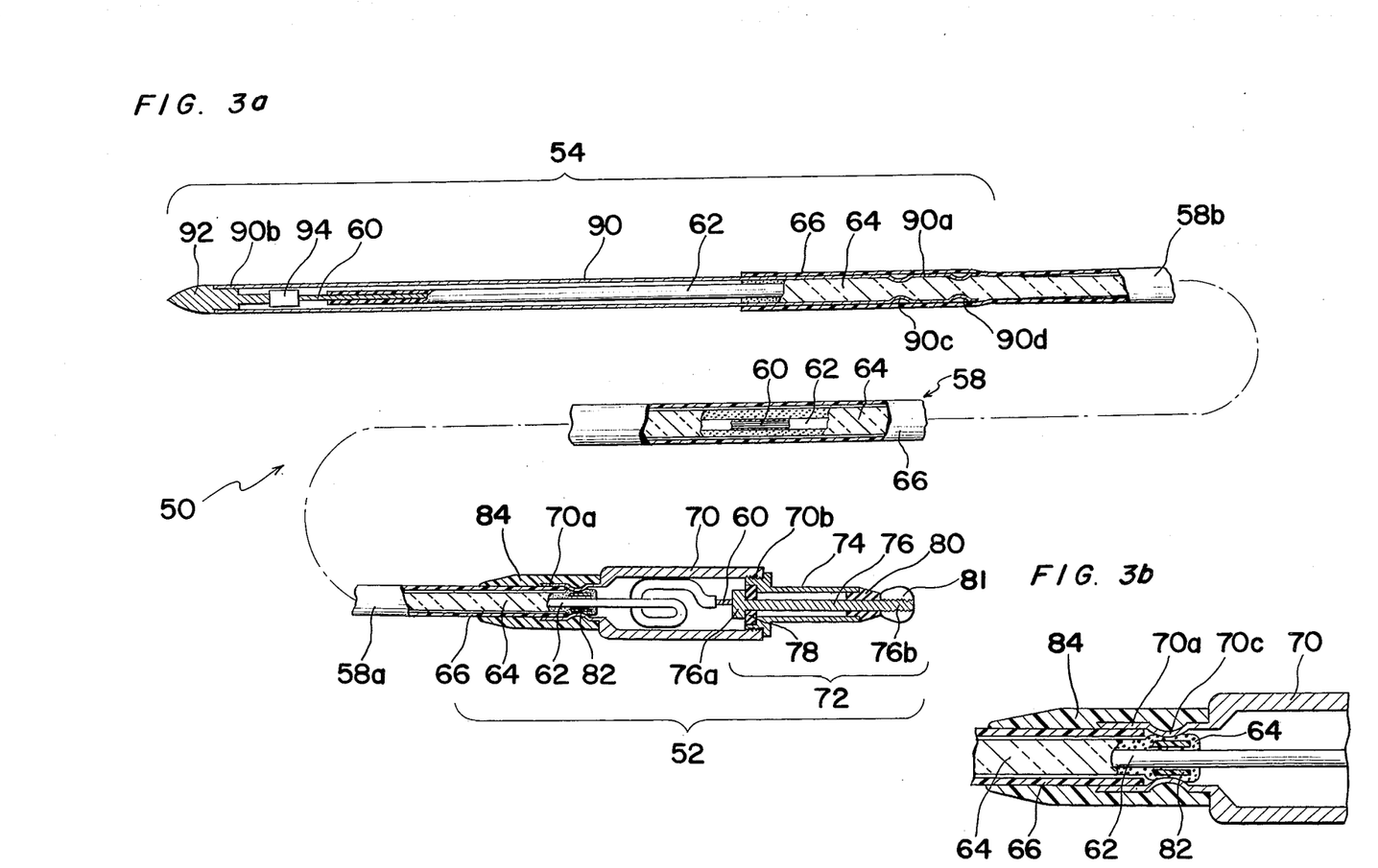

Referring now to FIG. 3a, there is shown a fragmentary view of the temperature detecting unit 50 comprising the plug portion 52, the detecting portion 54 and the concentric cable 58 extended between the plug portion 52 and the detecting portion 54. The concentric cable 58 is any known type of cable having an inner lead line 60 which is preferably formed by a plurality of thin wires being twisted, an inner insulating tube 62 made of high insulating and flexible material such as silicon for insulating the inner lead line 60, an outer lead line 64 formed by a plurality of thin wires netted around the inner insulating tube 62 and an outer insulating tube 66 also made of high insulating and flexible material for insulating the outer lead line 64. Since lead lines 60 and 64 are formed by the thin wires while the insulating tubes are made of flexible material, the cable 58 is submissive to or absorb various bending movements, so that the detecting portion 54 may be extended to any place within its reach without any difficulty. Preferably, the outer insulating tube is made of material having some degree of elasticity.

One end portion 58a of the cable 58 is connected to the plug portion 52 comprising a cylindrical metallic casing 70 having one end portion 70a being narrowed for fitly inserting therein the end of the cable 58 and for connecting the casing 70 with the outer lead line 64 while the other end portion 70b is threaded, around inner face thereof, for threading thereinto a plug member 72. The plug member 72 comprises a cylindrical metallic projection 74 electrically connected to the outer lead line 64 through the casing 70 and having a shape capable of being inserted into the pin-jack and a conductive rod member 76 electrically connected to the inner lead line 60 and coaxially extending through the inside of the projection 74. These metallic projection 74 and the rod member 76 serve as terminal members to be connected with control system. One end portion 76a which is located inside the casing 70 is supported by the edge of the projection 74 through a suitable insulating ring member 78 which is also serving as a washer. The other end portion 76b which projects outwardly from the projection 74 is supported by the opposite edge of the projection 74 through a suitable insulating ring member 80 which is also serving as a washer. The projecting tip end of the rod member 76 is threaded for threading thereon a ball shaped nut 81 for simple connection with a terminal in the pin-jack.

When inserting the end 58a of the cable 58 into the reduced diameter portion or narrowed end portion 70a of the casing 70, the outer insulating tube 66 and the outer lead line 64 are removed for some length for connecting the tip end of the bared inner lead line 60 with the end of the rod member 76. It is to be noted that the removed part, that is the cable without the outer lead line and the outer insulating tube, is comparatively longer in length than the distance between the narrowed end portion 70a and the end of the rod member 76a, so that the connection between the tip end of the bared inner lead line 60 and the end of the rod member 76a may not receive any pulling force therebetween when the cable is unexpectedly pulled. The outer insulating tube is further removed for electrically connecting the outer lead line 64 with the narrowed end portion 70a. In order to ensure the connection between the bared outer lead line 64 and the narrowed end portion 70a, a cylindrical member 82 made of synthetic resin is provided on the inner insulating tube 62 at a place where the outer lead line 64 is bared, as best shown in FIG. 3b. Approximately at this place, the narrowed end portion 70a is forcibly bent inwardly to be further narrowed completely therearound so as to form a bottle neck portion 70c, so that the outer lead line 64 is tightly held between the bottle neck portion 70c and the cylindrical member 82. The narrowed end portion 70a and a part of end portion 58a of the cable 58 is covered by a bushing 84.

Because of the characteristics of the synthetic resin, the cylindrical member 82, upon receipt of some pressure therearound by the bottle neck portion 70c, may have the outer surface thereof indented or sunk in for some degrees, and the pressure therearound is equally distributed. Therefore, the outer lead line 64 is tightly held between the portion 70c and the member 82 without giving any damage such as scratches to the lead line 64.

Furthermore, since the outer diameter of the cylindrical member 82 is larger than that of the inner insulating tube 62, the outer lead line 64 between the portion 70c and the member 82 can be held with comparatively great force.

On the other hand, because of the characteristics of the synthetic resin, the cylindrical member 82 may not have the inner face thereof deformed so much as to lose its original configuration, so that the inner insulating tube 62 provided with the inner lead line 60 can freely pass through the inner face of the cylindrical member 82.

In the case where the cable 58 is pulled by an unexpected force, the outer insulating tube 66 and the outer lead line 64 may be expanded for some degrees while the inner insulating tube 62 and the inner lead line 60 may slidingly move, with respect to said expansion, through the cylindrical member 82 so as to prevent the inner lead line 60 from being expanded or broken.

It is to be noted that the casing 70 may be covered by any suitable insulating material such as synthetic resin for protecting the casing 70 from an undesirable external electrical connection.

Still referring to FIG. 3a, the detecting portion 54 of the temperature detecting unit 50 comprises a probe which is constituted by a metallic tube 90, a spearhead shaped head member 92 and a temperature detecting element 94. In regard to the metallic tube 90, one end portion 90a thereof is inserted into the end portion 58b of the cable 58, particularly between the outer insulating tube 66 and the outer lead line 64, while the other end portion 90b thereof is tightly provided with the head member 92. Extended inside the metallic tube 90 is the inner lead line 60 provided with the inner insulating tube 62. The tip end of the lead line 60 where it is bared is connected to the temperature detecting element 94 which in turn is connected to one end of the head member 92. The other end of the head member 92 which is projecting outwardly from the metallic tube 90 is suitably pointed for facilitating the insertion of the probe into the food item. It is to be noted that the temperature detecting element 94 capable of producing a signal indicative of the detected temperature is substantially connected between the inner lead line 60 and the outer lead line 64 through the head member 92 and metallic tube 90, so that the temperature signal generated in the temperature detecting element 94 is transmitted through the cable 58 to the control system. In order to ensure the connection between the metallic tube 90 and the outer lead line 64, the end portion 90a where the tube 90 is inserted into the cable 58 is formed with one or more bottle neck portions 90c and 90d where the diameter of the metallic tube is reduced.

Figure 4:
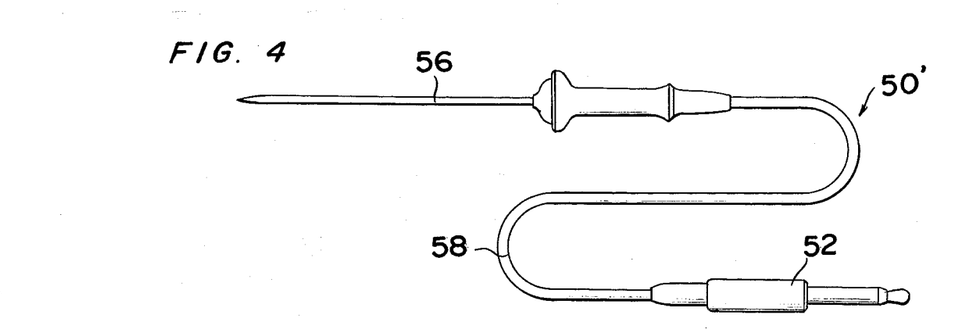
FIG. 4 is a similar view to FIG. 2, but particularly showing a modification thereof.
Figure 5:
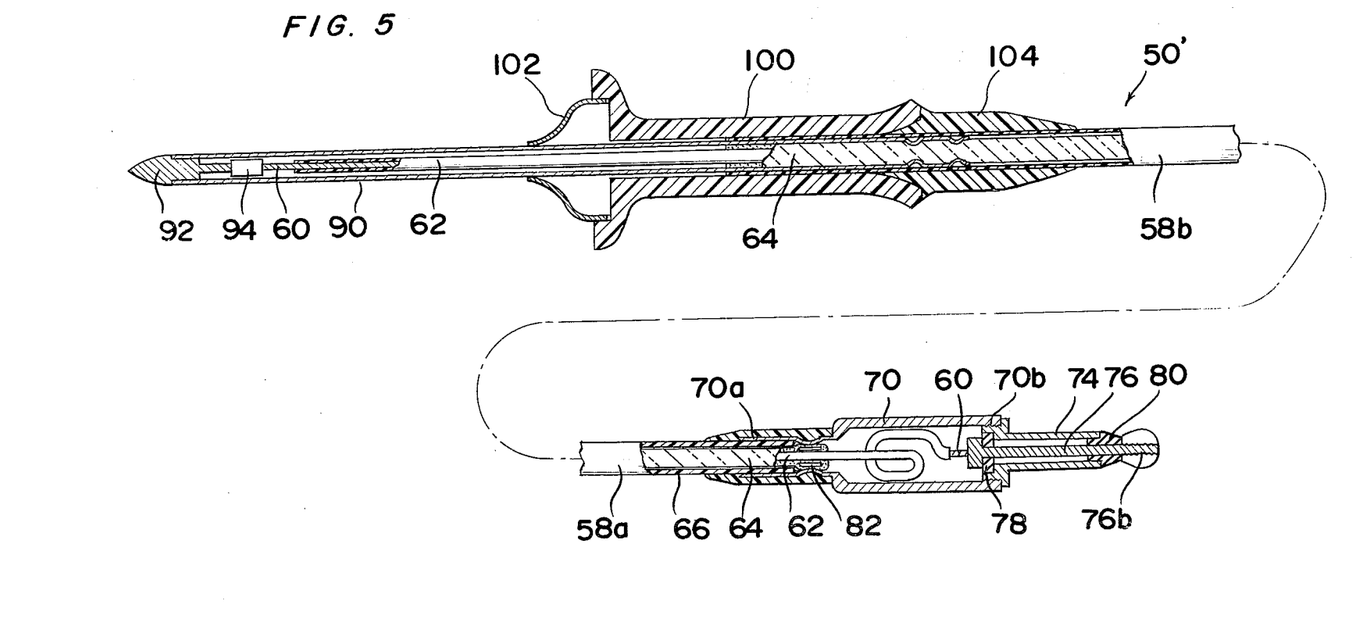
FIG. 5 is a similar view to FIG. 3, but particularly showing a fragmentary sectional view of the temperature detecting unit shown in FIG. 4.

Referring to FIGS. 4 and 5, there is shown a temperature detecting unit 50' which is a modification of the temperature detecting unit 50 described above in connection with FIGS. 2, 3a and 3b. The temperature detecting unit 50' in this modification further comprises, in addition to the temperature detecting unit 50, a cover member 100 which is fitly provided on the metallic tube 90 to cover up the right-hand side half of the tube 90, when viewed in FIG. 5, a sleeve member 102 which is also provided on the tube 90 with right-hand side thereof tightly connected to the left-hand side end of the cover member 100 and left-hand side thereof fitly engages with the outer surface of the metallic tube 90, and a bushing member 104 which is provided on the end portion of the metallic tube 90 and partly on the cable 58b. It is to be noted that the cover member 100 and the bushing member 104 are formed by any known insulating material such as synthetic resin or silicon rubber, while the sleeve member 102 is preferably formed by a metallic plate. It is also to be noted that the outer diameter of the left-hand side of the cover member 100 is greater than the largest diameter in the sleeve member 102 so as to prevent the sleeve member 102 and also the metallic tube 90 from contacting the inner surface of the oven M.

According to the temperature detecting unit 50', since the outer diameter of the cover member 100 is greater than the metallic tube 90, it is further easy to handle the temperature detecting portion 54 than the bare metallic tube 90 and the increasing diameter of the cover member 100 towards left-hand side end thereof facilitates the insertion of the probe into the food item.

Furthermore, a bushing 104 which is made of comparatively hard material protects the cable 58b from being bent abruptly at the joint with the metallic tube 90 so as to avoid damage of the cable at said joint, while large area of the contact between the bushing 104 and the cable 58 increase the adhesive or bonding effect therebetween.

The adhesive material or bond used for constructing the temperature detecting unit 50 or 50' is preferably composed of heat resistive material with low frequency loss such as silicone compound adhesive material. However, this type of adhesive material is inferior, when compared with other types of adhesive material both in resistance against peeling off and resistance against tearing off. Therefore, according to the present invention, there is provided metallic tube, that is narrowed end portion 70a and metallic tube 90, for preventing the bonded sections from being bent.

Furthermore, the temperature detecting unit of the present invention is arranged to eliminate, as much as possible, the edges and pointing portion of the conductive material where the electric charge is liable to be accumulated, or otherwise such edges and pointing portions are highly insulated from neighboring conductive material so as to avoid the spark discharge therebetween. Such arrangements can be seen, for example, at the right-hand side edge of the metallic tube 90 where the edge thereof is tightly connected with the outer lead line by the bottle neck portion 90d and also at the left-hand side edge of the casing 70 where the edge thereof is highly insulated from the neighboring conductive material, that is, the outer lead line 64 by the outer insulating tube 66.

Figure 6:
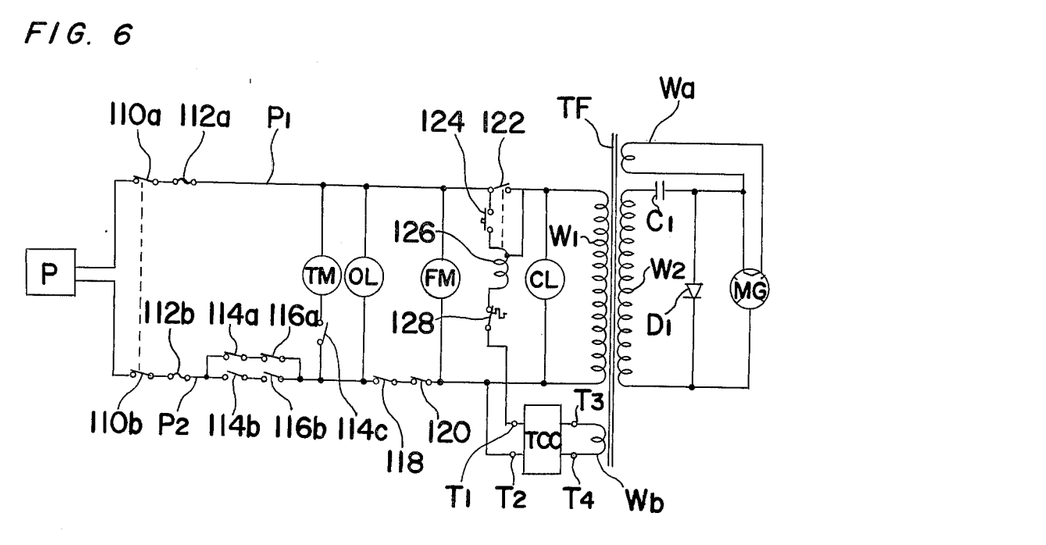
FIG. 6 is a circuit diagram of a control system for cooking time.

Referring now to FIG. 6, there is shown a control system for controlling the cooking time in two different systems which are already referred to. The control system, which is provided between the power source P, normally the commercial A.C. power source, and the transformer TF for energizing the magnetron, comprises a pair of safety switches 110a and 110b each provided in a first and second lead lines $P_1$ and $P_2$, respectively. A pair of fuses 112a and 112b are also provided in the lead lines $P_1$ and $P_2$. First and second sensor switches 114a and 114b and first and second timer switches 116a and 116b are provided in the second lead line $P_2$, in which the first sensor switch 114a and the first timer switch 116a are connected in series, and the second sensor switch 114b and the second timer switch 116b are connected in series, while these two series connections are connected in parallel to each other. Connected between the first and the second lead lines $P_1$ and $P_2$ are a timer motor TM and a third sensor switch 114c which are connected in series. The timer motor TM provided for carrying out the time preference system, is coupled with the cooking time setting dial 14 and is capable for conducting the line therethrough during the set time determined by the cooking time setting dial 14. Also connected between the first and the second lead lines $P_1$ and $P_2$ are an oven lamp OL which illuminates inside of the oven M, and a fan motor FM. A latch switch 118 and a door switch 120 are provided in the second lead line $P_2$ and between joints of the second lead line $P_2$ with the oven lamp OL and the fan motor FM.

Between the first and second lead lines $P_1$ and $P_2$, there is provided a cook switch 124, a relay coil 126, a thermal switch 128 and a temperature control circuit TCC, which are connected in series. In this series connection, the cook switch 124 is identical with the previously mentioned cook switch 18 described in connection with FIG. 1, and pushing of the cook switch 18 excites the relay coil 126 which actuates a relay switch 122 which is provided in the first lead line $P_1$. The relay switch 122 is maintained in on-state during the excitation of the relay coil 126. The thermal switch 128 is provided for automatically opening the circuit when the temperature in the oven exceeds a predetermined temperature. The temperature control circuit TCC having four terminals $T_1$, $T_2$, $T_3$ and $T_4$ is provided for carrying out the temperature preference system described above. Finally, provided between the first and second lead lines $P_1$ and $P_2$ is a cook lamp CL which is illuminated to indicate the on-state of the oven M.

The leading edges of the first and second lead lines $P_1$ and $P_2$ are connected to the opposite ends of the primary winding $W_1$ of the transfer TF, while the secondary winding $W_2$ is connected to the magnetron MG. A capacitor $C_1$ and a diode $D_1$ connected to the secondary winding $W_2$ are provided for forming a half-wave rectifier circuit.

Figure 7:
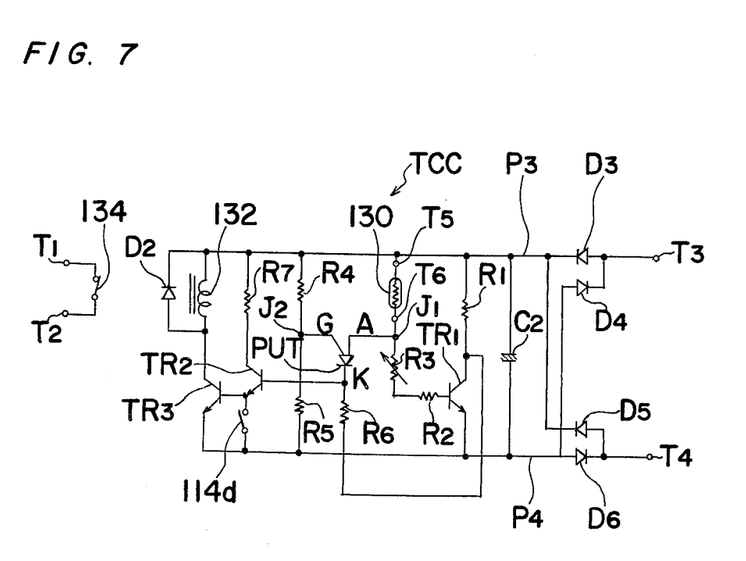
FIG. 7 is a circuit diagram of a temperature control circuit presented for connecting the temperature detecting unit of the invention.

Referring to FIG. 7, there is shown a detailed connection of the temperature control circuit TCC in which the terminals $T_3$ and $T_4$ are connected to the opposite ends of a second subsidiary winding Wb which produces a voltage signal thereacross indicative of on-state of the magnetron MG. Extended from the terminals $T_3$ and $T_4$ are lead lines $P_3$ and $P_4$, respectively. Provided between the lead lines $P_3$ and $P_4$ are diodes $D_3$, $D_4$, $D_5$ and $D_6$ and also a capacitor $C_2$ for forming a full-wave rectifying circuit. A resistor $R_1$ and a transistor $TR_1$ connected in series are connected between the lead lines $P_3$ and $P_4$. The base of the transistor $TR_1$ is connected to the line $P_3$ through a series connection of a resistor $R_2$, a variable resistor $R_3$ and a thermistor 130. The thermistor 130 connected between terminals $T_5$ and $T_6$ is identical with the temperature detecting element 94 described above in connection with FIG. 3. In relation to the rise in the temperature in the food item, the resistance in the thermistor 130 decreases, so that a voltage at a junction $J_1$ between the thermistor 130 and a variable resistor $R_3$ increases. A resistor $R_4$ and $R_5$ connected in series is provided between the lines $P_3$ and $P_4$ so as to produce a predetermined voltage at a junction $J_2$ of the resistors $R_4$ and $R_5$. Provided between the junctions $J_1$ and $J_2$ is a programmable uni-junction transistor PUT, in which the anode A thereof is connected to the junction $J_1$, the gate G thereof is connected to the junction $J_2$ and the cathode K thereof is connected to the collector of the transistor $TR_1$ through a resistor $R_6$. A resistor $R_7$, a transistor $TR_2$ and a fourth senser switch 114d which are connected in series are provided between the lines $P_3$ and $P_4$. The base of the transistor $TR_2$ is connected to the cathode K of the programmable uni-junction transistor PUT. A relay coil 132 and a transistor $TR_3$ which are connected in series are connected between the lines $P_3$ and $P_4$ and a diode $D_2$ is connected in parallel to the relay coil 132. The relay coil 132 is coupled with a normally closed relay switch 134 which is connected between the terminals $T_1$ and $T_2$, so as to open the switch 134 during excitation of the relay coil 132. The control system described above functions in a manner which is described hereinbelow.

First, when carrying out the temperature preference system, the temperature detecting unit 50 of the present invention is provided in the microwave oven M upon insertion of the plug portion 52 into the pin-jack. Therefore, the circuit shown in FIG. 7 is provided with the thermistor 130 as illustrated therein. Upon insertion of the plug 52 into the pin-jack, the senser switches and timer switches are turned in a position ready for the temperature preference system, in which the senser switch 114a is turned to on-state and the senser switches 114b, 114c and 114d are turned to off-state, while the timer switch 116a is turned to on-state and the timer switch 116b is turned to off-state as shown in FIGS. 6 and 7. Accordingly, the oven lamp OL starts to light. After having placed the food item into the oven M and having inserted the probe of the temperature detecting unit 50 into the food item, the door 4 is closed. Thus, the latch switch 118 and the door switch 120 are both turned to on-state. Accordingly, the fan motor FM is energized. Before turning on the cook switch 18, i.e., the cook switch 124, the temperature setting dial 12 is turned to a position indicative of degree of temperature to be achieved. Such turning of the dial 12 is applied to the variable resistor $R_3$ which changes its resistance value with respect to the dial 12. Then, the cook switch 18 which is identical with the cook switch 124 shown in FIG. 6 is turned on manually. Since the relay switch 134 is in the closed state, a current starts to flow through the relay coil 126 which exerts its generated magnetic force onto the relay switch 122 to be turned to on-state. Accordingly, the power from the power source P is supplied to the transformer TF and further to the magnetron MG, thus producing magnetic field in the oven M to start heating of the food item. During such operations as described above, the timer motor TM will not function in any manner since the senser switch 114c is in off-state.

As the temperature in the food item increases, the resistance value of the thermistor 130 decreases. Accordingly, the voltage level at the junction $J_1$, mainly determined by the thermistor 130 and the variable resistor $R_3$, increases, thus increasing the voltage level at the anode A of the programmable uni-junction transistor PUT. The gate G of the transistor PUT is provided with a predetermined voltage determined by the resistors $R_4$ and $R_5$. The transistor $TR_1$ is normally in on-state during the installation of the temperature detecting unit 50 in the oven M while the cathode K of the transistor PUT is producing a comparatively low voltage. In other words, the transistor PUT is in off-state. When the temperature of the food item reaches the predetermined temperature, the decrease in the resistance in the thermistor 130 increases the voltage level at the junction $J_1$, i.e., the anode voltage of the transistor PUT, so that the anode voltage of the transistor PUT becomes even with or overshoots the gate voltage of the transistor PUT, so that the transistor PUT is turned to on-state and that the resistor $R_6$ receives a comparatively large amount of current flow therethrough. Accordingly, the transistor $TR_2$ connected to the resistor $R_6$ is turned to on-state, and in turn, the transistor $TR_3$ is turned to on-state. Therefore, the relay coil 132 is excited to open the relay switch 134. As a result, the relay coil 126 is de-energized, and the relay switch 122 is opened to stop the energization of the magnetron MG.

In the case where the thermistor 130 is damaged to shortcircuit the terminals $T_5$ and $T_6$, the voltage at the anode A of the transistor PUT imediately increases to turn the transistor PUT in on-state. Thus, turning off the magnetron MG in the manner described above.

On the other hand, in the case where the thermistor 130 is damaged to open the terminals $T_5$ and $T_6$, the voltage at the base of the transistor $TR_1$ is reduced, thus turning the transistor $TR_1$ in off-state. Accordingly, the transistor $TR_2$ is provided, at the base thereof, with a voltage determined by the resistors $R_1$ and $R_6$, thus turning off the magnetron MG in the manner described above.

Secondly, when carrying out the time preference system, the temperature detecting unit 50 is disconnected from the control system and is taken out from the microwave oven M. Therefore, in this time preference system, the thermistor 130 is removed from the circuit shown in FIG. 7 and the terminals $T_5$ and $T_6$ are disconnected from each other. Upon extraction of the plug 52 from the pin-jack, the senser switches and timer switches are turned to opposite positions to those described above. More specifically, the senser switch 114a is turned to off-state and the senser switches 114b, 114c and 114d are turned to on-state, while the timer switch 116a is turned to off-state and the timer switch 116b is turned to on-state. Accordingly, the oven lamp OL as well as the timer motor TM are turned on, in which the timer motor TM is previously set to count a predetermined time determined by the cooking time setting dial 14. The operation thereafter is similar to those described above in the temperature preference system. After having passed a predetermined time set in the timer motor TM, a circuit (not shown) connected thereto operates to disconnect the power P from the transformer TF to stop energizing the magnetron MG.

It is to be noted that, during the operation of the time preference system, the circuit shown in FIG. 7 will not function in any manner, since the on-state of the senser switch 114d maintains the relay coil 132 in de-energized state, irrespective of the kind of signal applied to the base of the transistor $TR_2$.

Although the present invention has been fully described by way of examples with reference to the attached drawings, it is to be noted that various changes and modifications are apparent to those skilled in the art. Therefore, unless otherwise such changes and modifications depart from the scope of the present invention, they should be construed as included therein.

What is claimed is:

1. A temperature detecting unit for use in a microwave oven incorporated with a control system for controlling energized time thereof with respect to the temperature of an object to be heated placed inside a heating cavity, said control system connected to said temperature detecting unit through at least one pair of terminal means presented in a form of at least one pin-jack formed on a wall of said heating cavity, said temperature detecting unit comprising;

(a) a plug member having at least one projection provided with a first and second terminal means which are connectable to said pair of terminal means upon insertion of said projection into said pin-jack, a cylindrical casing having one end thereof connected to said projection and an other end portion being formed with a reduced diameter portion with an end thereof opened;

(b) an coaxial cable including an inner lead line, an inner insulating tube covered on the inner lead line, an outer lead line formed with a plurality of wires provided outside said inner insulating tube and a outer insulating tube covered on the outer lead line, and provided with a ring member slidably mounted on said inner insulating tube, said coaxial cable having one end inserted into said opening formed in said casing, said inner lead line loosely extended to firmly contact with said first terminal, and said outer lead line being bared and extended along said reduced diameter portion, said ring member provided between said inner insulating tube and said outer lead line at said reduced diameter portion, said reduced diameter portion further formed with a further reduced diameter portion for tightly holding said outer lead line between said further reduced diameter portion and said ring member; and (c) a probe member including an elongated tube member provided therein with a temperature detecting element, said elongated tube member having one end thereof formed in a shape capable of inserting the tube member into said object and an other end of said elongated tube member connected with an other end of said cable so as to connect said temperature detecting element with said inner and outer lead lines, said other end of said cable firmly connected with said other end of said elongated tube member by at least one reduced diameter portion formed in other end portion of said elongated tube member.

2. A temperature detecting unit as claimed in claim 1, wherein said probe member has the other end thereof covered with said outer insulating tube.

3. A temperature detecting unit as claimed in claim 1, wherein said outer insulating tube is made of elastic material.

4. A temperature detecting unit as claimed in claim 1, wherein said ring member is made of synthetic resin.

5. A temperature detecting unit as claimed in claim 1 further comprising a first bushing made of insulating material provided on said plug member over said reduced diameter portion.

6. A temperature detecting unit as claimed in claim 5, wherein said first bushing is made of material comprising a silicon rubber.

7. A temperature detecting unit as claimed in claim 6, wherein said first bushing is bonded onto said reduced diameter portion by an adhesive material comprising silicon.

8. A temperature detecting unit as claimed in claim 1 further comprising a second bushing made of insulating material provided on said probe member over said other end portion of said probe member through said outer insulating tube.

9. A temperature detecting unit as claimed in claim 8, wherein said second bushing is made of material comprising a silicon rubber.

10. A temperature detecting unit as claimed in claim 10, wherein said second bushing is bonded onto said outer insulating tube provided over said other end portion of said probe member by an adhesive material comprising silicon.

11. A temperature detecting unit as claimed in claim 1 further comprising a cylindrical handle member provided on said probe member, approximately half the length of said probe member, over a section connecting with said cable, said cylindrical handle member having diameter increased section at end portion of said handle close to said one end of said probe so as to maintain said probe member in a spaced relation from the wall of said heating cavity.

* * * * *